Jan. 12, 1960
S. L. SPENCER
2,920,919
FOLDABLE CAMPING TRAILER HAVING UPPER AND
LOWER TELESCOPICALLY RELATED
HOUSING SECTIONS
Filed Feb. 8, 1956
4 Sheets-Sheet 1
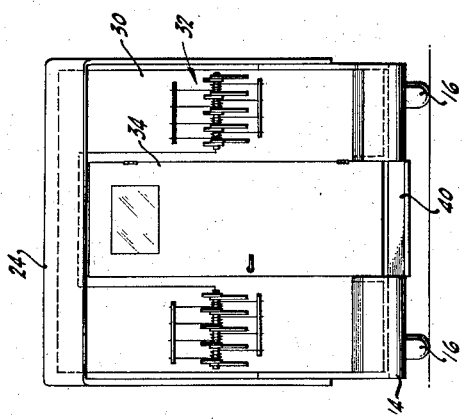
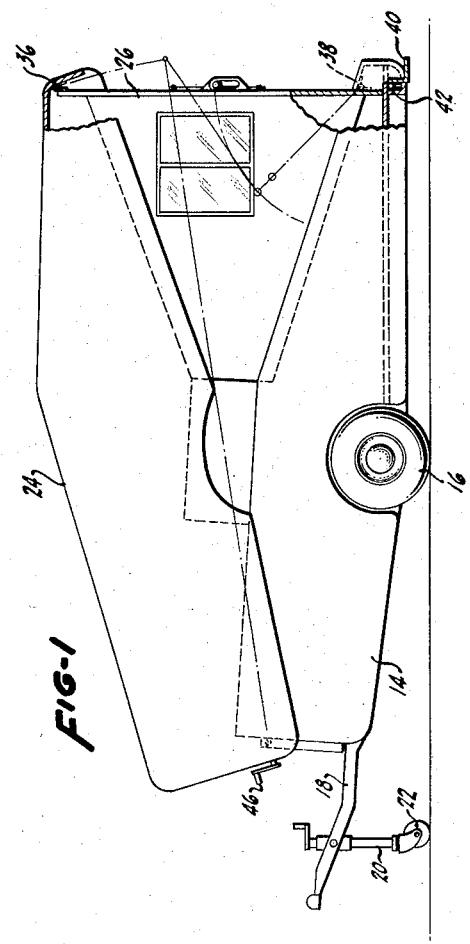
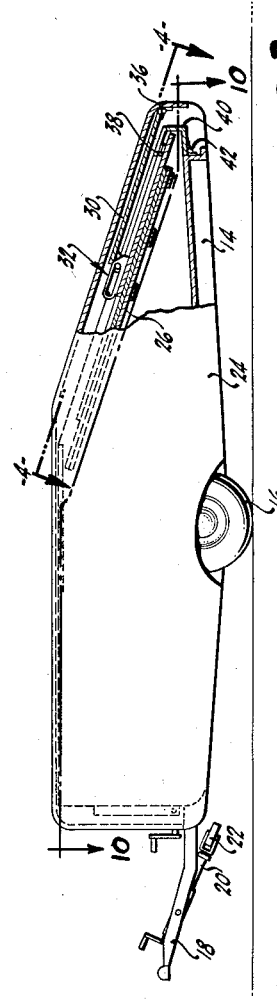
INVENTOR.
STEPHEN L. SPENCER
BY Naylor + Neal
ATTORNEYS

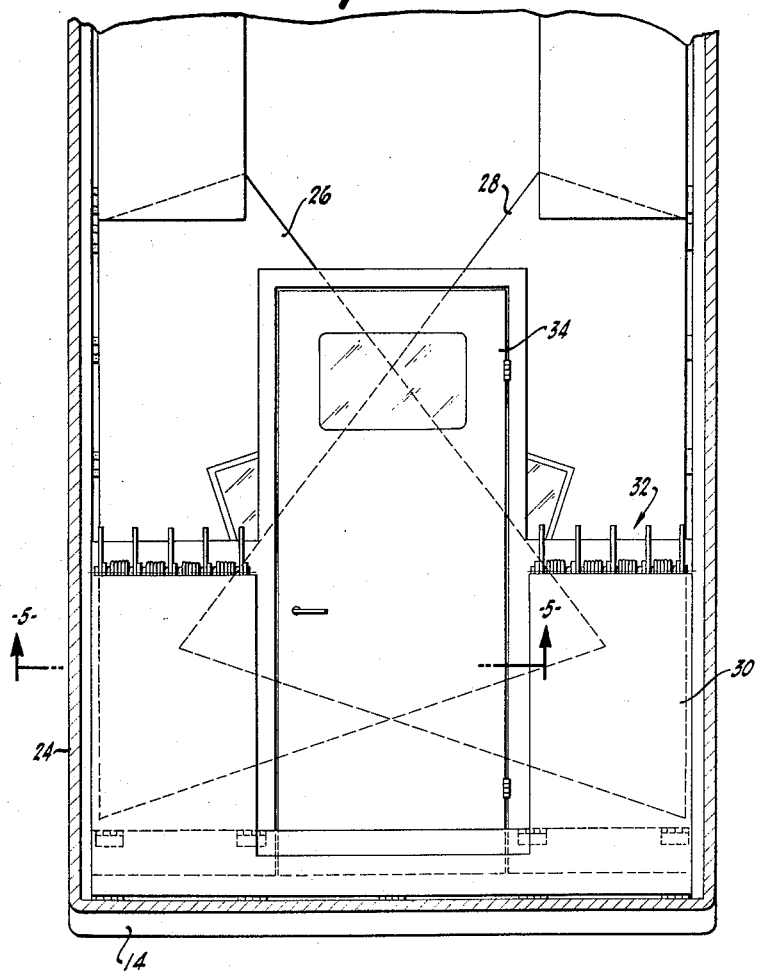
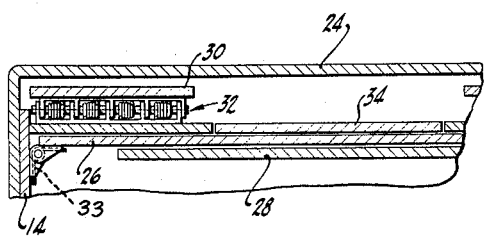

Jan. 12, 1960 S. L. SPENCER 2,920,919
FOLDABLE CAMPING TRAILER HAVING UPPER AND
LOWER TELESCOPICALLY RELATED
HOUSING SECTIONS
Filed Feb. 8, 1956 4 Sheets-Sheet 3

INVENTOR.
STEPHEN L. SPENCER
BY
Naylor & Neal
ATTORNEYS

Jan. 12, 1960   S. L. SPENCER   2,920,919
FOLDABLE CAMPING TRAILER HAVING UPPER AND
LOWER TELESCOPICALLY RELATED
HOUSING SECTIONS
Filed Feb. 8, 1956   4 Sheets-Sheet 4
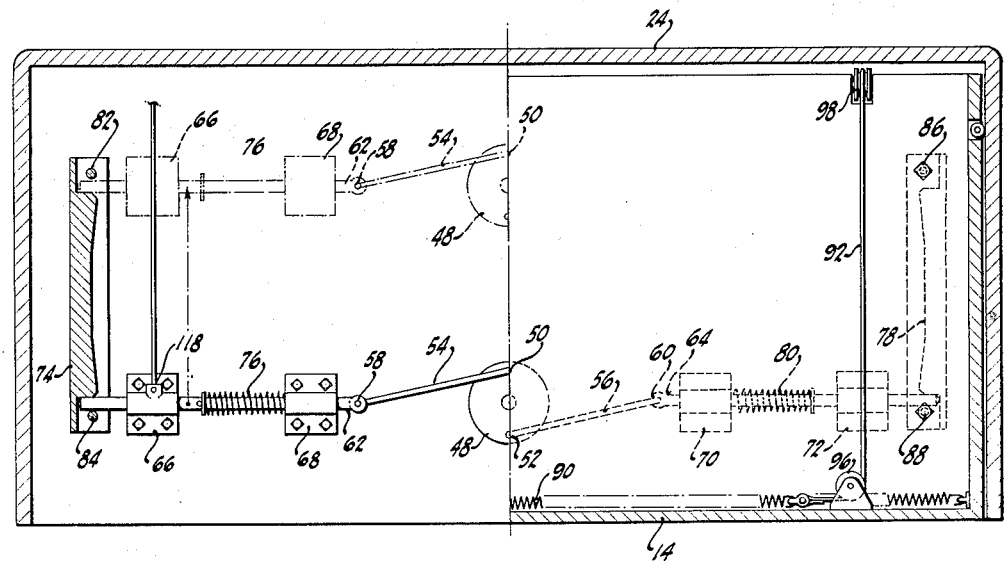
FIG-11
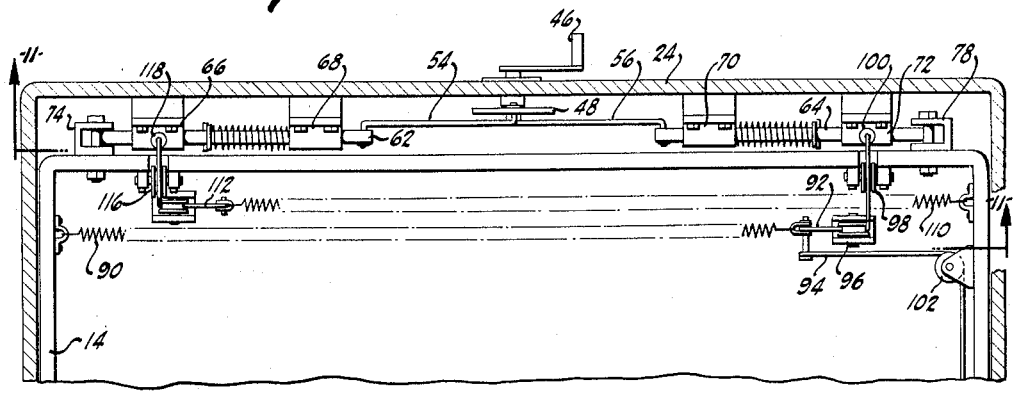
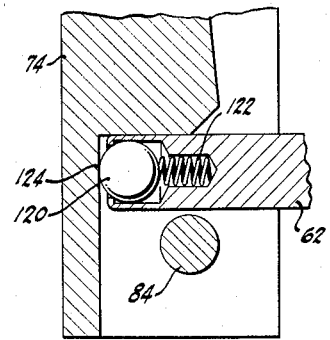
FIG-12
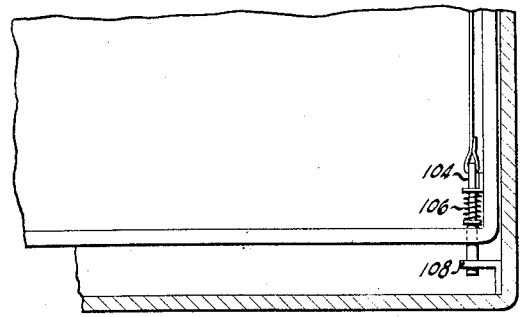
FIG-10
INVENTOR.
STEPHEN L. SPENCER
BY Naylor & Neal
ATTORNEYS

United States Patent Office 2,920,919
Patented Jan. 12, 1960

2,920,919

FOLDABLE CAMPING TRAILER HAVING UPPER AND LOWER TELESCOPICALLY RELATED HOUSING SECTIONS

Stephen L. Spencer, Atherton, Calif.

Application February 8, 1956, Serial No. 564,216

5 Claims. (Cl. 296—23)

This invention pertains to a foldable trailer, and more particularly to a foldable trailer adapted to expand at both front and rear from a lowered position to a raised position.

Conventional folding trailers customarily open on a hinge at the front and must be manually pushed open. Trailers with a hinge at the front have low headroom with the result that only a small portion of the space within the trailer is adapted for living, cooking, sleeping and storage.

The trailer contemplated by this invention expands at both the front and rear to allow the entire floor area to be used as living space for stove, toilet, refrigerator and beds. The entire assembly is adapted to be locked in a closed or in an expanded position. The assembly automatically rises due to spring action.

It is therefore an object of this invention to provide a novel folding or expandable trailer.

It is another object of this invention to provide a novel folding trailer adapted to be automatically raised at both ends.

It is yet another object of this invention to provide a novel folding trailer, spring biased into an open position, and having a locking mechanism for holding it in open or closed position.

It is a more particular object of this invention to provide a novel folding trailer adapted to be expanded into a full size room having guide means for guiding the parts of the trailer during opening operation, having spring means for biasing said trailer into expanded position, and having latch means for locking said trailer into open or closed position.

Other objects will become apparent from the following description taken in connection with the accompanying drawings in which:

Figure 1 is a side view of the trailer of this invention in the expanded position;

Figure 2 is a view taken from the right in Figure 1;

Figure 3 is a view, partially in section, showing the side of the trailer of this invention in folded position;

Figure 4 is a view, partially in section, taken at 4—4 in Figure 3;

Figure 5 is a view, partially in section, taken at 5—5 in Figure 4;

Figure 10 is a view, partially in section, taken at 10—10 in Figure 3;

Figure 11 is a view, partially in section, taken at 11—11 in Figure 10; and

Figure 12 is a fragmentary view of the locking mechanism of the trailer of this invention.

Figure 9:
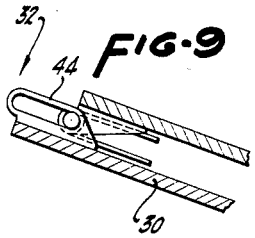
Figure 9 is a view of the hinge of Figure 7 in a fully closed position.

In Figures 1, 2 and 3, lower body, or housing portion, 14 is adapted to ride on wheels 16. Drawbar 18 is connected to the forward end of member 14. Strut 20 and auxiliary wheel 22 are adapted to support the trailer when it is not connected to a vehicle and are adapted to fold into a traveling position as shown in Figure 3. Upper body, or housing portion, 24 is adapted to enclose lower body 14 when the trailer is in the folded position of Figure 3, and is adapted to automatically rise into its opened position, as explained more fully hereinafter.

Both ends of upper body 24 are adapted to translate relative to body 14 when the trailer is opened. Side walls 26 and 28 are hinged to lie folded into the trailer when the trailer is closed and to unfold as shown in Figure 1 when the trailer is opened. Rear wall 30 is hinged at approximately the center thereof, as shown generally at 32, to lie folded in the trailer when the trailer is in the closed position of Figure 3 and to open as shown in Figures 1 and 2. Rear wall 30 is hinged to the top and bottom portions 24 and 14 at 36 and 38, respectively. Door 34 is adapted to fold at its bottom edge to lie inside of the trailer in a folded position, as shown more particularly in Figure 4. Step 40 is hinged at 42 to be extended when the trailer is opened to its expanded position.

Figure 4 is a view, taken at 4—4 in Figure 3, which shows the folded arrangement of side walls 26, 28, rear wall 30 and door 34. The stacking of the various layers of folded walls or partitions is shown more particularly in Figure 5, which is a view taken at 5—5 in Figure 4.

Figure 6:
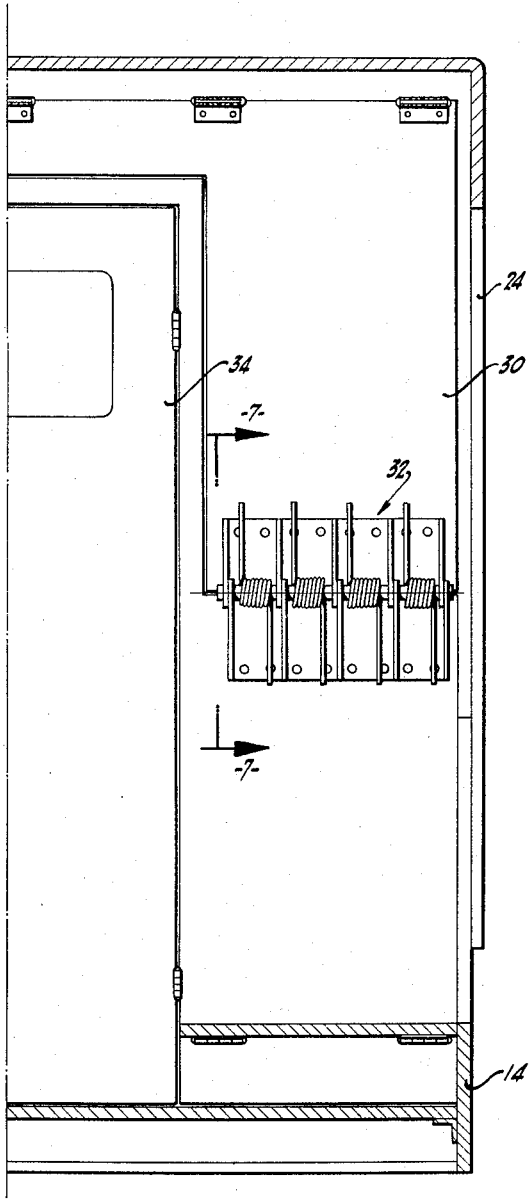
Figure 6 is an expanded view of half of the rear wall of the trailer of this invention.

Figure 6 is a view of a portion of a wall 30 of the trailer, particularly showing the hinged arrangement 32 which is adapted to allow rear wall 30 to be folded into the trailer when the trailer is in its closed position.

Figure 7:
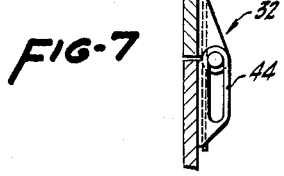
Figure 7 is a view, partially in section, taken at 7—7 in Figure 6.
Figure 8:
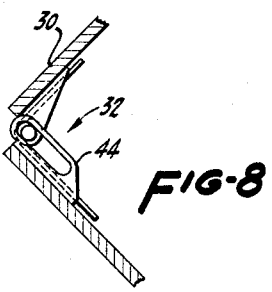
Figure 8 is a view of the hinge of Figure 7 in a half-open position.

Figures 7, 8 and 9 particularly show the hinged arrangement 32 in various folded positions. Figure 7 shows rear wall 30 in its opened position. Figure 8 shows rear wall 30 in a partially opened position. Figure 9 shows wall 30 in its closed position. A sliding attachment 44 is utilized to allow wall 30 to be folded without interference of the parts.

Figures 10 and 11 show the novel latch and guide mechanism of this invention. Handle 46 is shaft connected to drive eccentric member 48. Eccentric member 48 is pin connected at 50 and 52 to linkages 54 and 56, respectively. Linkages 54 and 56 are pin connected at 58 and 60 to sliding members 62 and 64, respectively. Members 62 and 64 are adapted to slide in bearing members 66, 68, 70 and 72. Member 62 is urged into contact with guide or cam means 74 by means of compression spring 76. Member 64 is urged into contact with guide or cam means 78 by means of compression spring 80. Bearing means 66, 68, 70 and 72 are rigidly attached to upper body 24 while guide or cam means 74 and 78, together with stops 82, 84, 86 and 88, are attached to bottom member 14.

Tension spring 90 is connected to bottom member 14 and adapted to pull cord or wire 92 and to pull cord or wire 94. Cord 92 passes over roller 96 and roller 98 and is connected to upper body 24 at 100. The urge of spring 90 tends to cause upper body 24 to rise. Cord 94 passes over roller 102 and is connected to latch member 104, which is biased by compression spring 106 into its locked engagement with member 108. Tension spring 110 is connected to lower body 14 and to cord or wire 112. Cord 112 passes over rollers 114 and 116 and is connected to upper body 24 at 118. The urge of spring 110 is adapted to cause upper body 24 to rise. When upper body 24 is in its fully raised position, members 48, 50, 54, 58, 62, 68, 76 and 66 are in the dotted position shown in Figure 11.

A detailed view of the end of member 62 is shown in

Figure 12. Ball bearing 120 is spring loaded by compression spring 122 to bear against bearing surface 124 and against guide means 74 during the raising operation.

In operation, handle 46 is turned which causes sliding members 62 and 64 to slide in their bearings and to be released from stops 84 and 88. Springs 90 and 110 pull the forward end of upper body 24 in an upward direction until members 62 and 64 reach the end of guide means 74 and 78 where they engage stops 82 and 86 to stop the upward motion of upper body 24 and to lock it into a raised position. When the forward end of upper body 24 starts to rise, cord 94 starts to move and cause latch 104 to disengage member 108 to allow the spring biasing means on the after end of the trailer, namely on the rear and side walls, to be forced into the opened position automatically open. When latch 104 is released from member 108, the springs at hinges 32 on rear wall 30 cause wall 30 to open and force the rear of upper body 24 to rise. Additional springs 33 (Figure 5) at the hinges of side walls 26 and 28 cause these walls to rise when upper body 24 rises.

There has thus been provided a novel foldable trailer adapted to fold into a closed position which is low enough to be conveniently stored in an ordinary sized garage but which opens to the size of a conventional, rigid trailer. The fold feature of this invention causes the center of gravity of the trailer, when it is being pulled, to be substantially in line with the pulling force on drawbar 18, with the result that there is practically no sway during travel.

Although the trailer of this invention has been described in detail, it is not intended that the scope of the invention should be limited by the particular embodiment shown but only in accordance with the scope of the appended claims, in which:

I claim:

1. A foldable trailer comprising a wheel-supported bottom housing portion, a top housing portion fitted over said bottom portion in telescoped relation therewith when said trailer is in the folded condition, means, including guide members carried by one of said housing portions and follower members movable in said guide members carried by the other of said housing portions, forming a pivotal and slidable connection between a pair of adjacently disposed ends of said housing portions enabling said top housing portion to pivotally and slidably move upwardly to an unfolded condition, latch means operable to retain said housing portions in folded condition, and yieldable means interconnecting said housing portions and operable in response to the release of said latch means to move said top housing portion to said unfolded condition.

2. A foldable trailer according to claim 1, said yieldable means including a spring biased end wall pivotally connected to the other end of one of said housing portions and operable to move from a downwardly inclined folded position to a vertically disposed unfolded position upon release of said latching means.

3. A foldable trailer according to claim 2, said yieldable means further including a pair of spring biased side walls pivotally connected to one of said housing portions and operable to move from a downwardly inclined folded position to a vertically disposed unfolded position upon release of said latching means.

4. A foldable trailer according to claim 3, said latching means including first latching means interconnecting said pair of adjacently disposed ends of said housing portions and second latching means interconnecting the opposite ends of said housing portions, and said yieldable means further including separate springs means interconnecting said housing portions, said separate spring means being operable upon release of said first latching means to initiate upward movement of said top housing portion with respect to said bottom housing portion at the pair of adjacently disposed ends thereof, and control means for said second latching means operable in response to said initial upward movement of said top housing portion to release said second latching means.

5. A foldable trailer according to claim 4, said side walls and end walls being pivotally connected to said bottom housing portion, whereby said separate spring means does not support any portion of the weight of said side walls and end walls.

References Cited in the file of this patent

UNITED STATES PATENTS

| | | |
|---|---|---|
| 2,119,154 | Downing | May 31, 1938 |
| 2,518,278 | Brumbaugh | Aug. 8, 1950 |
| 2,561,921 | Guillot | July 24, 1951 |
| 2,567,516 | Jones | Sept. 11, 1951 |
| 2,582,635 | Kipple | Jan. 15, 1952 |
| 2,589,416 | Miller | Mar. 18, 1952 |
| 2,656,216 | Bobroff | Oct. 20, 1953 |
| 2,718,015 | Fisk | Sept. 20, 1955 |

FOREIGN PATENTS

| | | |
|---|---|---|
| 1,093,992 | France | Dec. 1, 1954 |